United States Patent
Peirsman et al.

(10) Patent No.: US 9,519,293 B2
(45) Date of Patent: Dec. 13, 2016

(54) PRESSURE REGULATING VALVE FOR PRESSURE DRIVEN BEVERAGE DISPENSING APPARATUSES

(75) Inventors: Daniel Peirsman, Brussels (BE); Stijn Vandekerckhove, Brussels (BE)

(73) Assignee: AB INBEV NV, Brussels (BE)

( * ) Notice: Subject to any disclaimer, the term of this patent is extended or adjusted under 35 U.S.C. 154(b) by 178 days.

(21) Appl. No.: 13/516,024

(22) PCT Filed: Dec. 16, 2010

(86) PCT No.: PCT/EP2010/069970
§ 371 (c)(1),
(2), (4) Date: Aug. 20, 2012

(87) PCT Pub. No.: WO2011/073346
PCT Pub. Date: Jun. 23, 2011

(65) Prior Publication Data
US 2012/0305109 A1    Dec. 6, 2012

(30) Foreign Application Priority Data
Dec. 18, 2009  (EP) ..................... 09015693

(51) Int. Cl.
*F16K 31/12* (2006.01)
*G05D 16/06* (2006.01)

(52) U.S. Cl.
CPC ...... *G05D 16/0655* (2013.01); *Y10T 137/7793* (2015.04); *Y10T 137/7825* (2015.04)

(58) Field of Classification Search
CPC .................... Y10T 137/7825; Y10T 137/7836
(Continued)

(56) References Cited

U.S. PATENT DOCUMENTS 1,294,953 A  *  2/1919  Salt .................... 137/505.41
2,086,000 A      7/1937  Roren
(Continued)

FOREIGN PATENT DOCUMENTS

| AU | 2008240331 | 11/2008 |
|---|---|---|
| DE | 19802291 | 8/1999 |

(Continued)

OTHER PUBLICATIONS

"Integral" Merriam-Webster. Dec. 2015.*
International Search Report for PCT/EP2010/069970, Completed by the European Patent Office on Mar. 15, 2011, 2 Pages.

*Primary Examiner* — R. K. Arundale
(74) *Attorney, Agent, or Firm* — Brooks Kushman P.C.

(57) ABSTRACT

Pressure regulating valve for controlling the pressure at which a pressurized propellant gas is injected into a container containing a liquid for driving said liquid out of the container, said valve comprising: A first and a second polymeric shells, the first shell comprising a gas inlet and outlet openings, and the second shell containing means for resiliency biasing. A polymeric membrane, clamped between the first and second shells, thus defining a first and a second chambers sealingly separated by the membrane. A joint between the first and second polymeric shells, strong enough to withstand the pressures reigning in either chamber and ensuring fluid tightness between the two chambers; wherein, all polymeric components of said pressure regulating valve are made of the same polymer class.

10 Claims, 3 Drawing Sheets

(58) Field of Classification Search
USPC .......... 137/505.39, 505.41, 209; 222/399
See application file for complete search history.

(56) References Cited

U.S. PATENT DOCUMENTS

| | | | |
|---|---|---|---|
| 3,065,883 A | 11/1962 | Nelson | |
| 3,245,583 A | 4/1966 | Miller et al. | |
| 3,272,404 A | 9/1966 | Graves et al. | |
| 3,372,838 A | 3/1968 | Smith et al. | |
| 3,373,907 A | 3/1968 | Batrow | |
| 3,434,632 A | 3/1969 | Batrow | |
| 3,561,649 A | 2/1971 | Wilson | |
| 4,113,627 A * | 9/1978 | Leason | 210/446 |
| 4,216,879 A * | 8/1980 | McMillin | B67D 1/0009 137/209 |
| 4,537,387 A * | 8/1985 | Danby et al. | 251/331 |
| 4,754,777 A * | 7/1988 | Frode | 137/261 |
| 4,887,651 A * | 12/1989 | Santiago | B67D 1/04 141/1 |
| 4,978,478 A | 12/1990 | Vonderau et al. | |
| 5,199,609 A | 4/1993 | Ash, Jr. | |
| 5,240,144 A | 8/1993 | Feldman | |
| 5,251,787 A | 10/1993 | Simson | |
| 5,383,576 A | 1/1995 | Richter et al. | |
| 5,411,172 A | 5/1995 | Brugerolle et al. | |
| 5,573,145 A | 11/1996 | Groh | |
| 5,819,806 A | 10/1998 | Gasami et al. | |
| 6,403,008 B1 | 6/2002 | Schann | |
| 6,695,177 B2 | 2/2004 | Blicher | |
| 7,247,151 B2 | 7/2007 | Slawson | |
| 7,363,938 B1 * | 4/2008 | Newton | G05D 16/0672 137/315.05 |
| 7,810,679 B2 | 10/2010 | Wauters et al. | |
| 2003/0172971 A1 | 9/2003 | Yoshino et al. | |
| 2007/0221273 A1 * | 9/2007 | Landers | F16K 17/196 137/510 |
| 2007/0272317 A1 | 11/2007 | Klopfenstein et al. | |
| 2009/0108031 A1 | 4/2009 | Anderson | |

FOREIGN PATENT DOCUMENTS

| | | |
|---|---|---|
| DE | 10211663 | 10/2003 |
| DE | 102007001215 | 10/2008 |
| EP | 0149352 | 7/1985 |
| EP | 1088640 | 4/2001 |
| FR | 2418352 | 9/1979 |
| GB | 1163761 | 9/1969 |
| GB | 1427732 | 3/1976 |
| JP | 4331879 | 11/1992 |
| JP | 7217755 | 8/1995 |
| JP | 11170296 | 6/1999 |
| WO | 9429094 | 12/1994 |
| WO | 2005007559 | 1/2005 |
| WO | 2006128653 | 12/2006 |
| WO | 2007019852 | 2/2007 |
| WO | 2007019853 | 2/2007 |
| WO | 2007145641 | 12/2007 |

* cited by examiner

PRESSURE REGULATING VALVE FOR PRESSURE DRIVEN BEVERAGE DISPENSING APPARATUSES

CROSS-REFERENCE TO RELATED APPLICATION

This application is the U.S. national phase of PCT Appln. No. PCT/EP2010/069970 filed Dec. 16, 2010 which claims priority to European application 09015693.6 filed Dec. 18, 2009, the disclosures of which are incorporated in their entirety by reference herein.

FIELD OF THE INVENTION

The present invention relates to the field of dispensing devices for liquids, in particular of pressure driven beverage dispensing apparatuses. It concerns a pressure regulating valve for delivering a propellant gas stored in a cartridge at a first, high pressure to a container at a second, lower pressure suitable for driving the dispensing of a beverage contained therein.

BACKGROUND OF THE INVENTION

Liquid dispensing devices have been on the market for ages. Many of them rely on a pressurized gas raising the pressure to a level of about 0.5 to 1.5 bar above atmospheric in the interior of a container containing the liquid to be dispensed, in particular a beverage like beer or other carbonized beverages. The gas is either fed directly into the container containing the liquid like e.g., in U.S. Pat. No. 5,199,609 or between an external, rather stiff container and an inner, flexible vessel (e.g., a bag or a flexible bottle) containing the liquid to be dispensed, like in U.S. Pat. No. 5,240,144 (cf. appended FIG. 1(a)&(b)). Both applications have their pros and cons which are well known to the persons skilled in the art. The present invention applies equally to both types of delivery systems.

The compressed gas may be provided by a compressor, included in a specific appliance (cf. U.S. Pat. No. 5,251,787), or contained in a compressed gas bottle (cf. U.S. Pat. No. 5,383,576, FIG. 7). More recently, a market for disposable, stand alone, home appliances has been developing rapidly. For obvious technical and economic reasons, no compressor or large compressed gas bottle can be used in such disposable devices, and the propellant gas is then usually contained in a rather small pressurized cartridge closed by a cap or a membrane. The cap or membrane of these home dispensers may be pierced open in plant but, to avoid risks of leakage, it is usually preferred that the piercing of the closure be performed by the end-user prior to using the device for the first time. Examples of such devices can be found in EP149352, WO2007/145641, GB1427732, GB1163761, U.S. Pat. No. 3,372,838, and WO2006/128653.

The propellant gas stored in a bottle or cartridge is at a pressure much higher than the 0.5 to 1.5 bar required in the container to drive the dispensing of the beverage. It is therefore necessary to interpose between the gas bottle or cartridge and the container a pressure regulating valve for reducing the pressure of a propellant gas stored in a bottle or cartridge at a first, high pressure to a second, lower pressure suitable for driving the dispensing of the beverage. For beverage dispensing apparatuses, diaphragm regulating valves are usually preferred. A diaphragm valve comprises two chambers separated by a diaphragm or membrane. The first chamber comprises a fluid outlet in fluid communication with the container containing the liquid to be dispensed, as well as a fluid inlet which can be sealed by sealing means such as for example a ball attached to the membrane, adapted to seal said inlet when the pressure in the first chamber raises above a desired level. The second chamber comprises means for resiliently biasing the diaphragm such as to dislodge the sealing means from their seat when the pressure in the first chamber is below the desired level, and thus unsealing the inlet to allow pressurized gas to penetrate and thus raise the pressure to the desired level in the first chamber, Said means comprise for example a helicoidal spring.

The diaphragm or membrane (used here as synonyms) generally comprises an elastomeric peripheral section concentrically surrounding a central, more rigid section such as disclosed in WO94/29094. The central rigid section is designed to support the load of the diaphragm biasing means (e.g., helicoidal spring), whilst the elastomeric peripheral section allows for the required movements of the diaphragm and ensures gas tightness of the chambers when sandwiched between the walls defining the two chambers. Diaphragms made of a single material were proposed for certain applications, such as in FR2418352 in the field of pumps, or U.S. Pat. No. 4,978,478 in the field of carburators.

Diaphragm regulating valves are usually manufactured by producing two half shells defining the walls of the first and second chambers, which are then joined together, with the diaphragm sealingly sandwiched therebetween. Joining of the half shells can be achieved by many techniques known in the art, such as solvent welding, heat or vibration welding, gluing, and any mechanical fastening means, like screws, rivets, or snap fittings.

It can be seen that pressure regulating valves are relatively complex devices with a number of materials used for the various components: the housing of the two chambers, the diaphragm, and means for biasing the diaphragm, e.g., helicoidal spring. The manufacturing of a pressure regulating chamber often requires several assembly steps which further increase the cost of production.

US2003/0172971 discloses a valve for ultrapure water lines and for various chemical liquid lines allowing the reduction of eluted impurities and of contamination with chemical solutions by ensuring that all members of the valve in contact with the fluid flowing therethrough are made of a material having a high chemical resistance like PTFE. The members not in contact with the fluid, on the other hand, are made of another material, such as the ring 3 made of polypropylene and the O-rings made of an elastic rubber material. These expensive valves are suitable for highly demanding applications and are designed to last a long time and not particularly to facilitate recycling thereof, since this is not a major issue for such specialized items.

Recently, a market for stand-alone home appliances has been developing rapidly. In particular, some of these appliances are not meant to be reloaded after use with a new container and should be disposed of once the original container is empty. It is clear that the design of such all-in-one, ready-to-use, disposable appliances is severely cost driven, as the cost of the packaging and dispensing mechanism should not unreasonably outweigh the cost of the beverage to be dispensed, and sold in relatively small quantities in a container of a capacity of the order of 1 to 10 l, maybe up to 20 l. Furthermore, recycling of the components of disposable appliances is a problem which cannot be overlooked nowadays. A major problem with recycling is separating the appliance components made of differing materials.

The existing pressure regulating valves are not adapted to the requirements of these new types of dispensers. There therefore remains a need for providing a low cost albeit reliable pressure regulating valve, which is easy to recycle.

SUMMARY OF THE INVENTION

The present invention is defined in the appended independent claims. Preferred embodiments are defined in the dependent claims. The present invention provides a pressure regulating valve for controlling the pressure at which a pressurized propellant gas is injected into a container containing a liquid for driving said liquid out of the container, said valve comprising:

- A first and a second polymeric shells, the first shell comprising a gas inlet and outlet openings, and the second shell containing means for resiliently biasing,
- a polymeric membrane clamped between the first and second shells, thus defining a first and a second chambers sealingly separated by the membrane,
- a joint between the first and second polymeric shells, strong enough to withstand the pressures reigning in either chamber and ensuring fluid tightness between the two chambers characterized in that, all polymeric components of said pressure regulating valve are made of the same polymer class, preferably selected from polyolefins, in particular, polypropylene, polyethylene; polyamides; polystyrenes, and polyesters.

The joint between the first and second polymeric shells is advantageously ensured by an over-injected polymeric ribbon running along the whole length of the interface of the two shells and the membrane. The ribbon is made of the same polymeric class as the remaining polymeric components of the pressure regulating valve. The means for resiliently biasing the membrane may consist of a helicoidal spring, an elastomeric bloc, a hydraulic system, etc.

The present invention also concerns a method for manufacturing a pressure regulating valve as defined above comprising the following steps:

- injecting in two cavities of a single tool two polymeric shells;
- moving the two shells thus produced in registry;
- interposing between the two shells a polymeric membrane;
- overinjecting along the interface between the two shells and the membrane a polymeric ribbon to sealingly join them, thus forming a chamber divided in two sealed off compartments by the membrane, characterized in that, all polymeric components of said pressure regulating valve are made of the same polymer class.

The membrane is preferably injected in a third cavity of the same tool as the one used for injecting the two shells.

DETAILED DESCRIPTION OF THE INVENTION

Figure 1:
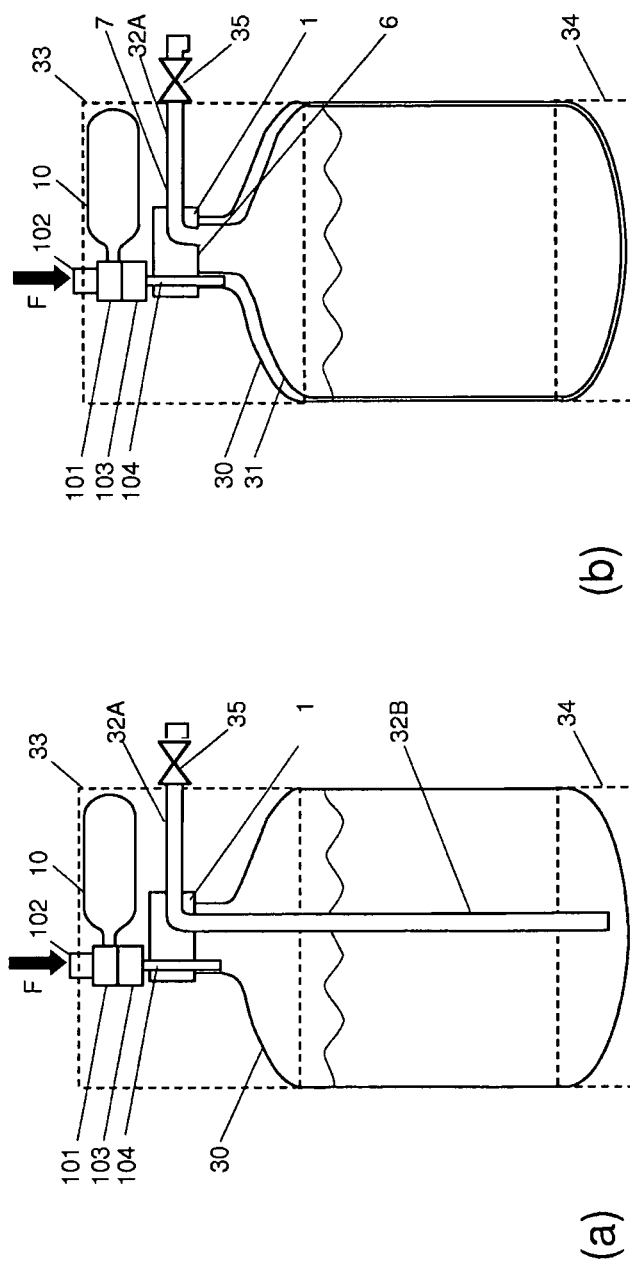
FIG. 1: schematic representation of two embodiments of a device according to the present invention.

FIG. 1 shows two alternative embodiments of liquid dispensing devices according to the present invention. The design of the devices depicted in FIG. 1 is typical of disposable home dispensing devices, but the invention is not limited to these types of appliances, and can, on the contrary, be applied to any type of beverage gas driven dispensing apparatus. In both embodiments of FIG. 1, the dispensing of a liquid, generally a beverage like a beer or a carbonated soft drink, is driven by a pressurized gas contained in a gas cartridge (10). Upon piercing of the closure of the pressurized gas cartridge (10) by actuation by an actuator (102) of a piercing unit (101), the gas contained in the cartridge (10) is brought into fluid communication with the container (30) at a reduced pressure via the pressure regulating valve (103). In FIG. 1(a) the gas is introduced through the gas duct (104) directly into the container (30) and brought into contact with the liquid contained therein, whilst in the embodiment depicted in FIG. 1(b), the gas is injected at the interface between an outer, rather rigid container (30) and a flexible inner container or bag (31) containing the liquid. In this latter embodiment, the gas never contacts the liquid to be dispensed.

In both embodiments, the pressure in the vessel (30, 31) increases to a level of the order of 0.5 to 1.5 bar above atmospheric (i.e., 1.5 to 2.5 bar) and forces the liquid through the channel opening (6), via the drawing stem (32B), if any, and flows along the dispensing tube (32A) to reach the tap (35). In the case of bag-in-containers as illustrated in FIG. 1(b), the use of a drawing stem (32B) is not mandatory since the bag (30) collapses upon pressurization of the volume comprised between the bag (30) and the container (31), thus allowing the beverage to contact the channel opening (6) without necessarily requiring a drawing stem (32B). In order to control the pressure and rate of the flowing liquid reaching the open tap at atmospheric pressure, a pressure reducing channel is sometimes interposed between the container (30) and the tap (35) (not represented in FIG. 1). A top chime (33) generally made of plastic, such as polypropylene, serves for aesthetic as well as safety reasons, to hide and protect from any mishandling or from any impact the dispensing systems and pressurized gas container. A bottom stand (34) generally made of the same material as the top chime (33) gives stability to the dispenser when standing in its upright position.

The pressurized gas is stored in a cartridge (10) at a pressure typically in the range of 10 to 100 bar whilst, as mentioned above, the pressure in the container (30) is of the order of 0.5 to 1.5 bar above atmospheric. The pressure regulating valve (103) must therefore be able to withstand a pressure of the order of 100 bar and to reduce the pressure of the gas to a value of up to two orders of magnitude. The force exerted on the membrane and joint by the pressure reigning in the first chamber determines the mechanical properties required by the resilient means (7) for biasing the membrane (9) as well as the delamination resistance required by the joint joining the half shells defining the first and second chambers separated by the membrane.

The first half shell (2) (cf. FIG. 2) defines together with the membrane (9) the first chamber which is in fluid communication through an inlet opening (5) with the interior of the cartridge (10) containing the propellant gas at high pressure. The first chamber also comprises at least one outlet opening (4), which is in fluid communication with the interior of container (30), to allow propellant gas to be injected into the container (30) at a reduced pressure. The second half shell (3) (cf. FIG. 2) defines together with the membrane (9) the second chamber containing means (7) for biasing the membrane (9) to obturate the openings (4).

Figure 2:
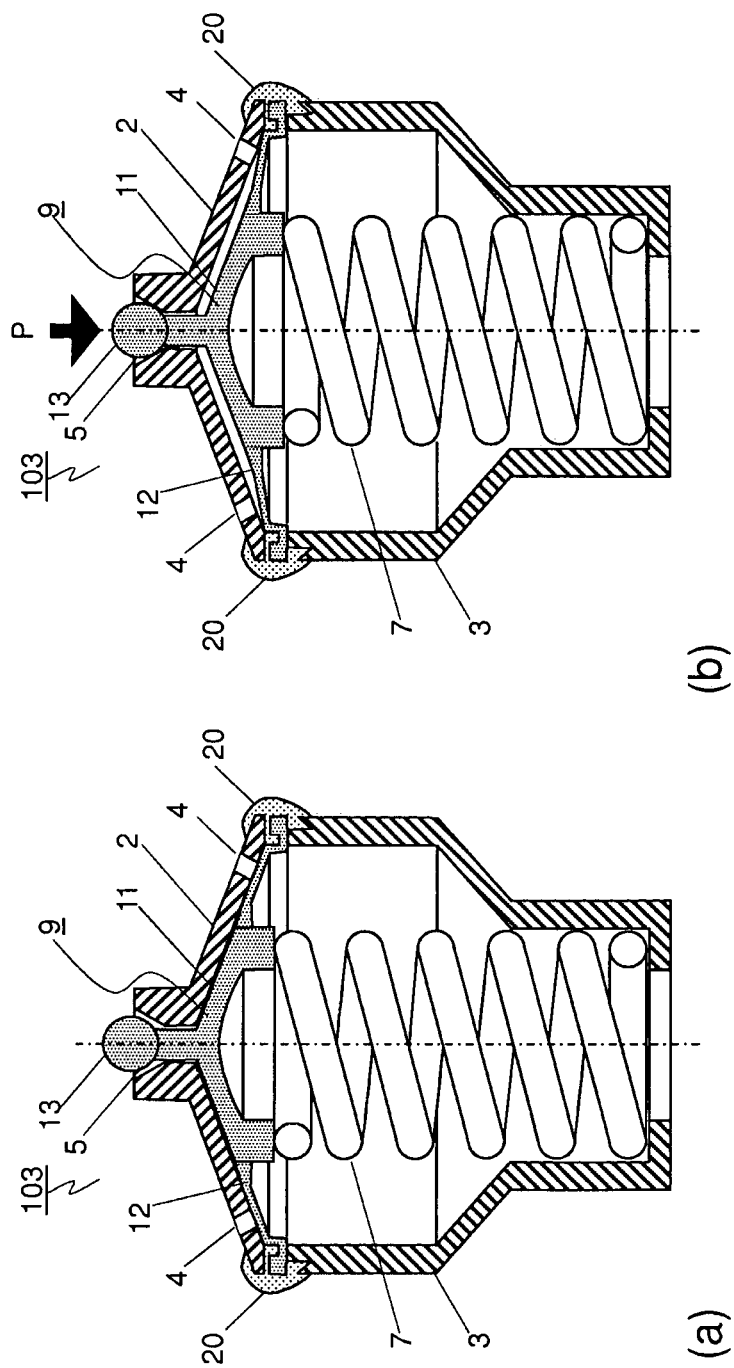
FIG. 2: schematic representation of a pressure regulating valve according to the present invention (a) in closed position and (b) in open position.
Figure 3:
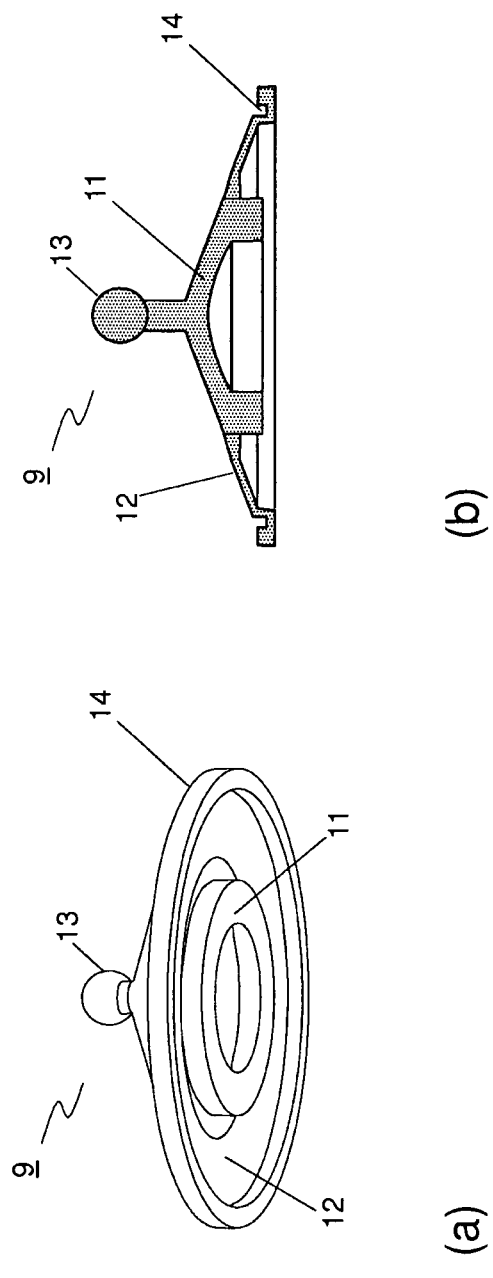
FIG. 3: schematic representation of a diaphragm suitable for a pressure regulating valve according to the present invention.

The membrane (9) sealingly separates the first from the second chambers and is sandwiched between the first and second half-shells (2, 3). It comprises a central section (11) resting on the means (7) for biasing the membrane and as such is sturdier than the peripheral section (12) concentrically surrounding it, which is flexible enough to liberate the passages (4) when the pressure in the first chamber is sufficient to compress the means (7) for resiliently biasing the membrane. The diaphragm (9) further comprises means (13) for obturating the inlet opening (5) when the pressure in the first chamber is above a given pressure limit value. Said means comprise a body having a surface matching a surface of said inlet opening (5). The body of the obturating means (13) is generally connected to the membrane itself through a central stem sufficiently thin to allow the free passage thereof through the inlet opening (5) such that the membrane and the body of the obturating means (13) are located on either side of the opening (5), and sufficiently long to allow a certain compression of the membrane biasing means (7) before the matching surfaces of the obturating means (13) and of the opening (5) sealingly contact one another. With this configuration, as the pressure grows in the first chamber, the biasing means (7) are progressively compressed until the displacement of the membrane corresponds to the free length of the stem supporting the body of the obturating means which then sealingly contact said matching surface of the inlet opening (5). Only when the pressure in the first chamber drops sufficiently can the biasing means resiliently recover some of their original geometry, thus dislodging the body of the obturating means from opening (5). In FIGS. 2 and 3 the body of the obturating means (13) is represented as a ball of substantially spherical shape. It is clear that other geometries, like a cone or similar, can be used instead.

As reviewed in the background section, the central and peripheral sections of the diaphragm are usually made of different materials, the former being a stiff material and the latter usually an elastomer. Alternatively, both sections may be made of the same material. According to the present invention, the diaphragm is made of a single polymer of the same class as the polymer constituting the first and second half shells (2) and (3). This configuration greatly eases recyclability and reduces the production costs, since all three components: first and second half shells and diaphragm, can thus be produced and assembled in a single injection moulding tool.

The polymeric components of the valve are of the same class if they belong to the same polymer family and do not require separation for recycling. In particular, several types of polyolefins are recycled together, such as polypropylene (PP) and polyethylene (PE), or two different grades of the same polymer, such as PE and HDPE. Similarly different grades of polayamides (PA) can be combined, such as PA6, PA6.6, PA6.10, PA12, etc. Other classes of polymers suitable for the present invention are thermoplastic polyesters, such as PET, PEN, polystyrenes, ABS, etc. A preferred class of polymers is polyolefin, in particular PP, for its high properties to price ratio. Thermoset materials could be used but their recycling is rather limited to grinding for use as solid fillers, and as such are less preferred than thermoplastic materials.

The means (7) for resiliently biasing the diaphragm (9) usually consists of a helicoidal spring. Other means, however, can be considered within the present invention, such as a resilient elastomeric bloc, or a hydraulic system. The nature of the biasing means, however, is not essential to the present invention. Upon recycling, a metallic helicoidal spring can easily be separated from the polymeric components of the valve with a magnet, by gravimetric methods or any other method known in the art. Similarly a resilient elastomeric bloc can be separated by gravimetric methods, although this is not an optimal solution for the valve recyclability.

The two half shells (2, 3) must be joined together with the diaphragm (9) sandwiched therebetween to form the first and second chambers of the valve. Several joining methods can be used. Care must be taken to ensure gas tightness at the joining line between the membrane (9) and the rims of the first and second half shells (2, 3). This requirement is particularly sensitive when, as according to the present invention, the diaphragm comprises no elastomeric peripheral section, which would ensure gas tightness between the two chambers simply by pressing the elastomeric material between the rims of the half shells. In this context, welding or gluing can give a suitable joint. Welding of polymeric components can be achieved e.g., with high frequency vibrations, using a solvent, or with heat. All these techniques, however, must be performed as a separate assembly stage, which increases the production costs. The same applies to joining with mechanical means, like screws or rivets, with the exception of snap fittings. In this case, however, the design must be such as to ensure gas tightness at the joining line between the shells and the diaphragm. A particularly preferred joining technique is to over-inject at the interface line a polymeric ribbon (20) of the same class as the other polymeric components of the valve. In order to strengthen the joint and to ensure gas tightness at the interface, the rims of the first and second shells (2, 3) and/or the peripheral edge of the membrane (9) advantageously have a specific structure such as grooves or protrusions for allowing the polymeric ribbon (20) to anchor the components together and to sealingly embed the peripheral edge of the membrane (9). This joining technique is particularly preferred because it has the following advantages:

the joint strength is particularly high;
 recyclability of the valve is made easier by the use of a single class of polymer for all its polymeric components, including the joining ribbon;
 gas tightness of the interface between the half shells and the diaphragm is ensured by the polymeric ribbon embedding the peripheral edge of the diaphragm;
 the joining operation does not require a separate assembly stage as it can be carried out within the same tool as the one used for the manufacture of the half shells (2, 3) and the diaphragm (9);
 one half shell (2, 3) of the valve can be an integral part of the chime (33) or of the closure (1) of the container (30), thus eliminating a further assembly step.

The pressure regulating valve of the present invention can be produced quite economically, a particularly sensitive issue for disposable home beverage dispensers of small capacity of the order of a few liters. The two half shells (2, 3) can be injection moulded in two cavities of a same tool. Advantageously, the diaphragm (9) is produced in a third cavity of the same tool. The cavity containing one half shell is shifted or rotated to a position facing the cavity containing the second half shell. Whether produced separately or within the same tool, the membrane (9) is inserted between the cavities containing the two half shells and clamped therebetween. A polymeric ribbon (20) is then injected at the interface between the two half shells and the membrane to form a strong sealing joint.

Tools designs and solutions for carrying out this processing technique have been proposed in the literature for other applications, such as in JP77217755, JP4331879, EP1088640, and DE10211663;

The invention claimed is:

1. A beverage dispensing apparatus for dispensing a beverage, said beverage dispensing apparatus comprising:
   a container for receiving a beverage,
   a pressure regulating valve, and
   a gas bottle or cartridge containing a pressurized propellant gas in fluid communication with said pressure regulating valve,
   wherein, the pressure regulating valve comprising:
      a first and a second polymeric shells, the first shell comprising a gas inlet and outlet openings, and the second shell containing a resilient biasing element,
      a polymeric membrane clamped between the first and second shells, thus defining a first and a second chambers sealingly separated by the membrane, the polymeric membrane cooperating with the resilient biasing element and the gas inlet to control a pressure at which said pressurized propellant gas is injected into the container for driving said beverage out of the container, and
      a joint between the first and second polymeric shells, strong enough to withstand the pressures reigning in either chamber and ensuring fluid tightness between the first and second chambers; and
   wherein, all polymeric components of said pressure regulating valve are made of the same polymer class.

2. The beverage dispensing apparatus according to claim 1 wherein said beverage dispensing apparatus is a disposable, home beverage dispensing apparatus.

3. The beverage dispensing apparatus according to claim 1, wherein the joint between the first and second polymeric shells of the pressure regulating valve is ensured by an over-injected polymeric ribbon running along the whole length of the joint between the first and second polymeric shells and the membrane, said polymeric ribbon being made of the same polymer class as the other polymeric components.

4. The beverage dispensing apparatus according to claim 3, wherein each of the first and second shells of the pressure regulating valve comprises a rim, and wherein said rim or a peripheral edge of the membrane have a specific structure for allowing the polymeric ribbon to anchor the components together and to sealingly embed the peripheral edge of the membrane.

5. The beverage dispensing apparatus according to claim 1, wherein the resilient biasing element of the pressure regulating valve comprises at least one of a helicoidal spring, an elastomeric bloc, and a hydraulic actuator.

6. The beverage dispensing apparatus according to claim 1, wherein a polymer class is selected from a group consisting of polyolefins, polypropylene, polyethylene; polyamides; polystyrenes, and polyesters.

7. The beverage dispensing apparatus according to claim 1, wherein the pressure regulating valve is suitable for generating a pressure difference between gas flowing in and gas flowing out is about 100 bar.

8. The beverage dispensing apparatus according to claim 1, wherein the container comprises a closure, and wherein one half shell of the pressure regulating valve is an integral part of said closure.

9. The beverage dispensing apparatus according to claim 2, wherein the beverage dispensing apparatus comprises a chime and, wherein one half shell of the pressure regulating valve is an integral part of said chime.

10. The beverage dispensing apparatus according to claim 1, wherein the membrane of the pressure regulating valve comprises means for obturating the inlet opening when the pressure in the first chamber is above a given pressure limit value, said means having a surface which is brought into sealing contact with a matching surface of said inlet opening when the resilient biasing element is compressed over a given value related to said pressure limit value.

* * * * *